United States Patent [19]
Maddox et al.

[11] 3,971,917
[45] July 27, 1976

[54] LABELS AND LABEL READERS

[76] Inventors: James A. Maddox; Jeffery R. Maddox, both of R.F.D. 2, Church St., Georgetown, Conn. 06829

[22] Filed: Aug. 1, 1974

[21] Appl. No.: 493,978

Related U.S. Application Data
[62] Division of Ser. No. 175,672, Aug. 27, 1971.

[52] U.S. Cl. ................ 235/61.11 E; 250/566; 353/99
[51] Int. Cl.² ............ G06K 7/10; G08C 9/06; G03B 21/28
[58] Field of Search .......... 235/61.11 E; 353/34, 353/38, 81, 82, 98, 99, 122; 250/566

[56] References Cited
UNITED STATES PATENTS

| | | | |
|---|---|---|---|
| 3,571,571 | 3/1971 | Kapsambelis | 235/61.11 E |
| 3,612,644 | 10/1971 | Stites | 235/61.11 E |
| 3,663,800 | 5/1972 | Myer et al. | 235/61.11 E |
| 3,676,645 | 7/1972 | Fickenscher et al. | 235/61.11 E |
| 3,708,655 | 1/1973 | Schanne | 235/61.11 E |

*Primary Examiner*—Daryl W. Cook
*Attorney, Agent, or Firm*—Mattern, Ware, Davis & Stoltz

[57] ABSTRACT

A label incorporating a plurality of concentric rings having two different light reflective characteristics provides a binary coded label on which any desired information can be displayed, and which may be secured to various objects. By passing the label in any orientation over a label scanning assembly which provides a scanning light beam, the label code signal is read and transmitted to a label information assembly which converts the label signal to digital signals, determines when the entire label signal has been read, and transmits the complete label information to data storage.

5 Claims, 13 Drawing Figures

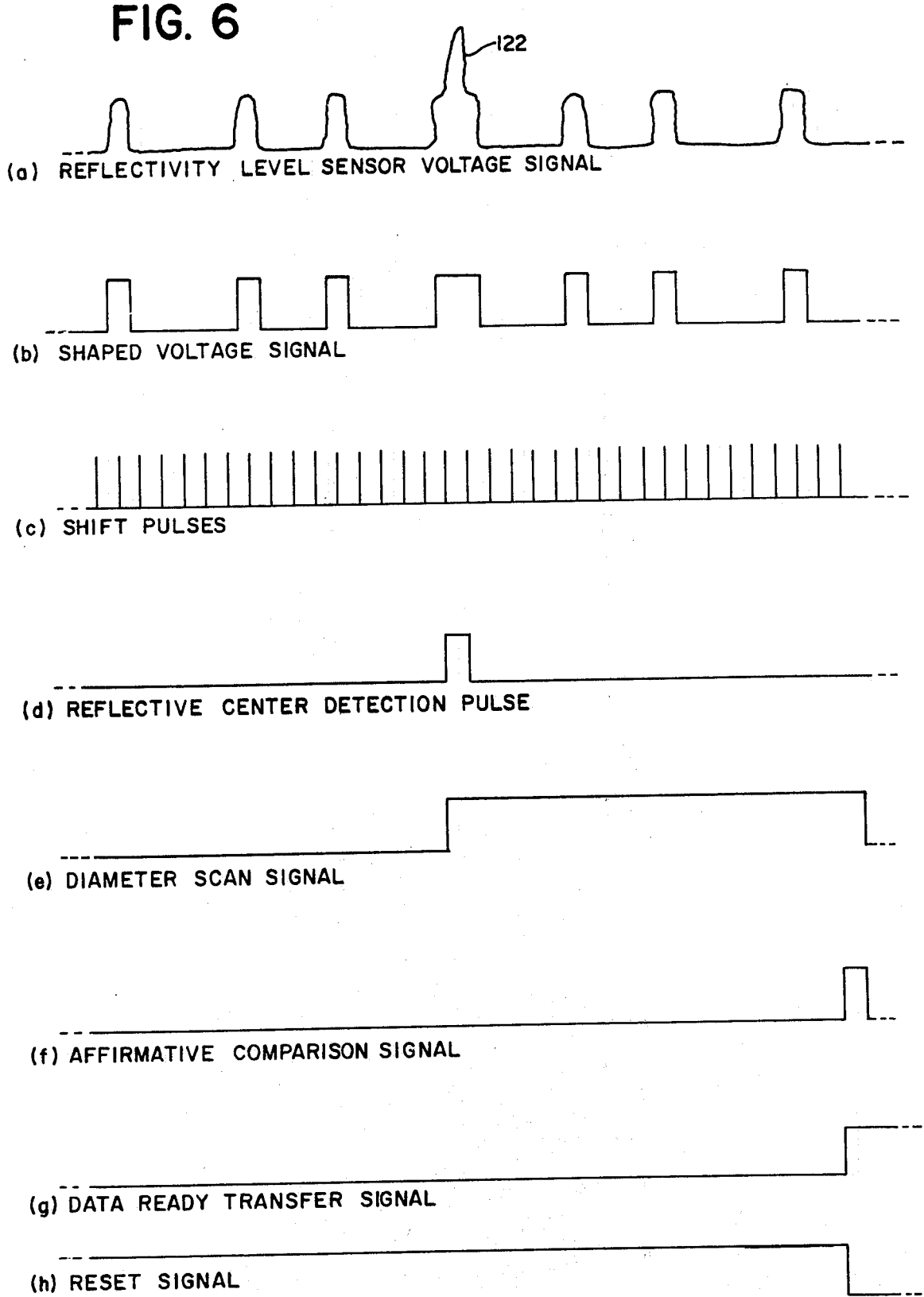

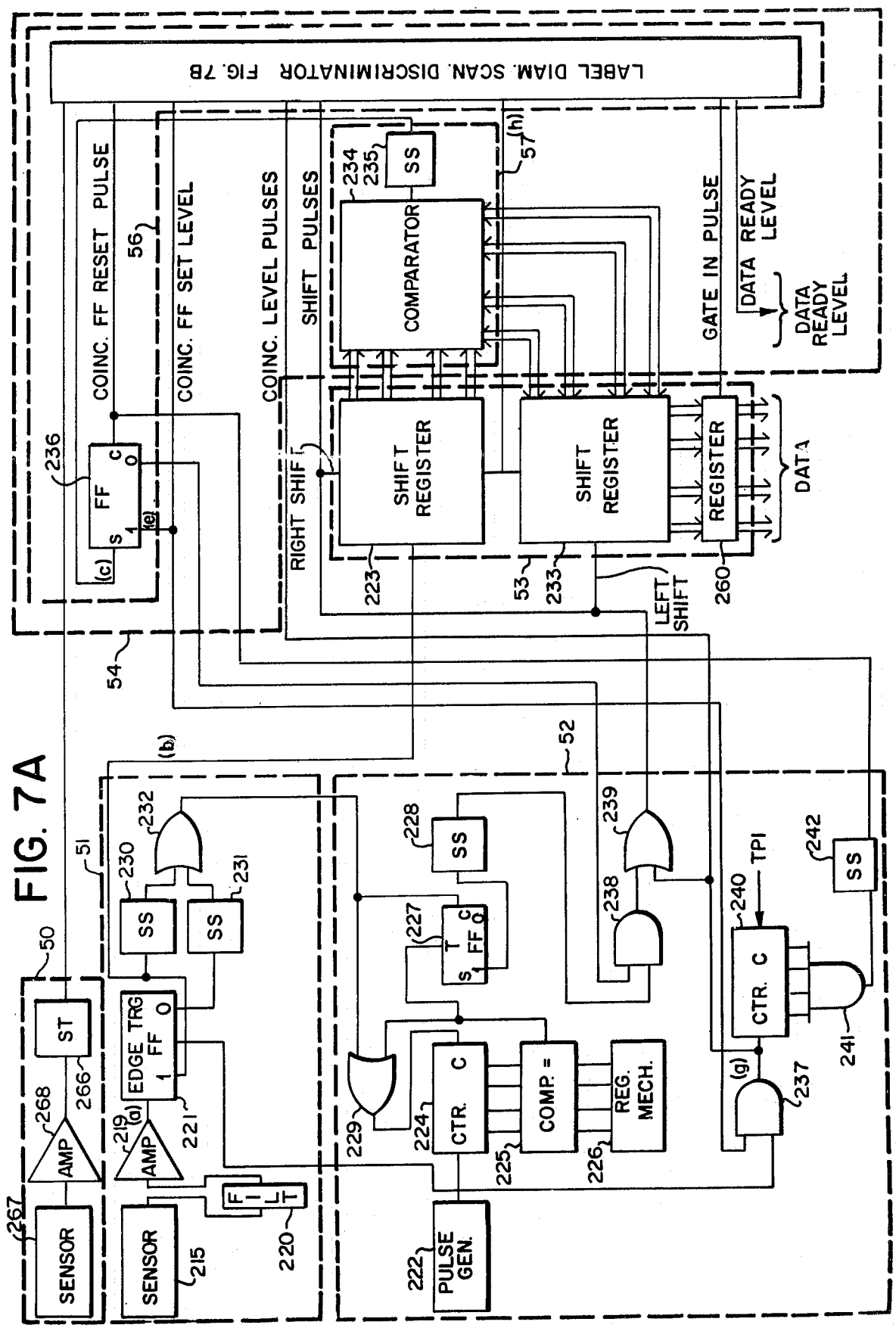

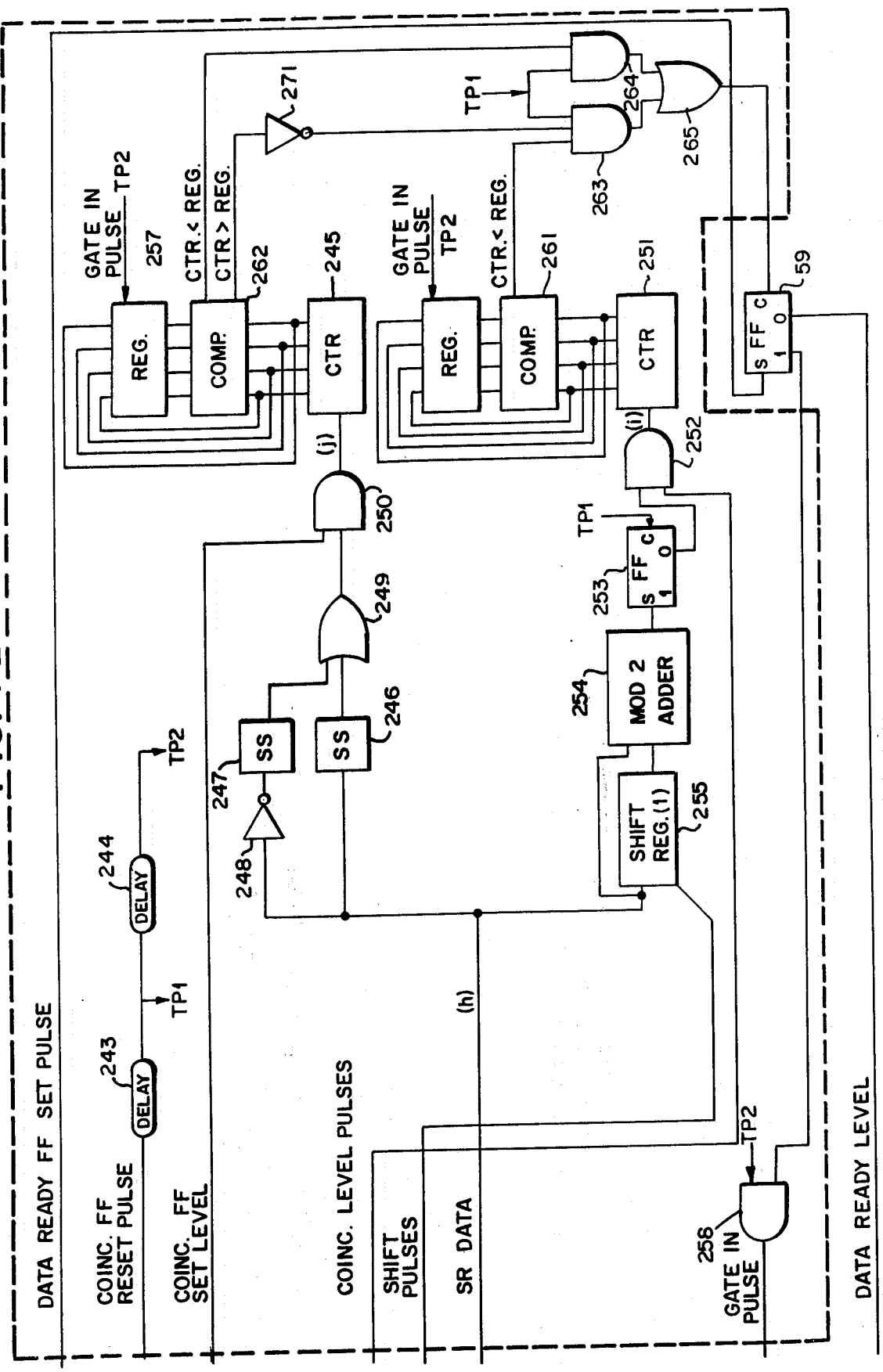

FIG. 8
(a) REFLECTIVITY LEVEL SENSOR VOLTAGE SIGNAL
(b) SHAPED VOLTAGE SIGNAL
(c) AFFIRMATIVE COMPARISON PULSE
(d) SHIFT PULSES
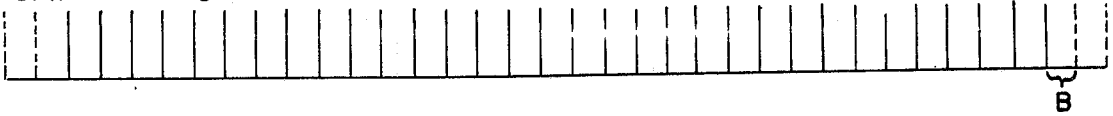
(e) SCAN ANALYZING ENABLING SIGNAL
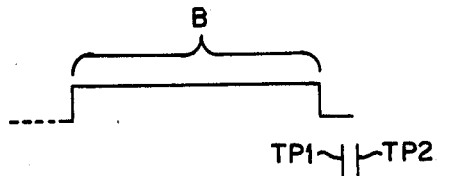
(f) DELAY PULSE
(g) BURST OF SHIFT PULSES
(h) SHIFT REGISTER TRANSFER VOLTAGE SIGNAL
(i) SIMILAR REFLECTIONS AT LABEL CENTER
(j) TRANSITIONS IN VOLTAGE SIGNAL

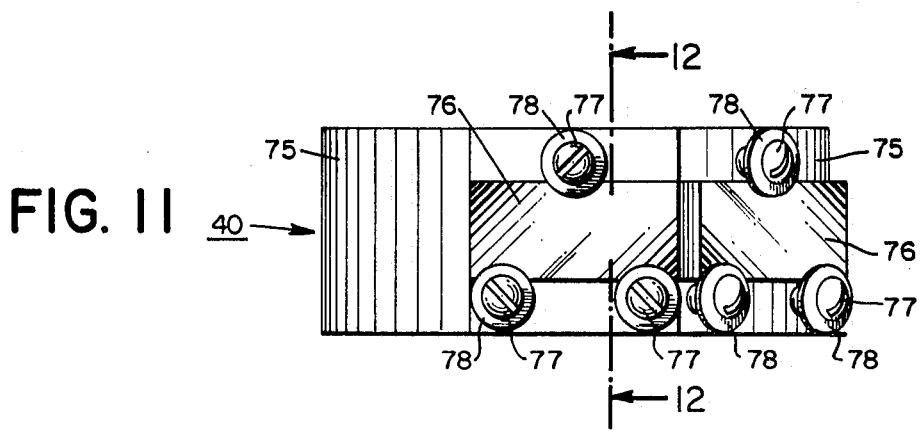
FIG. 11
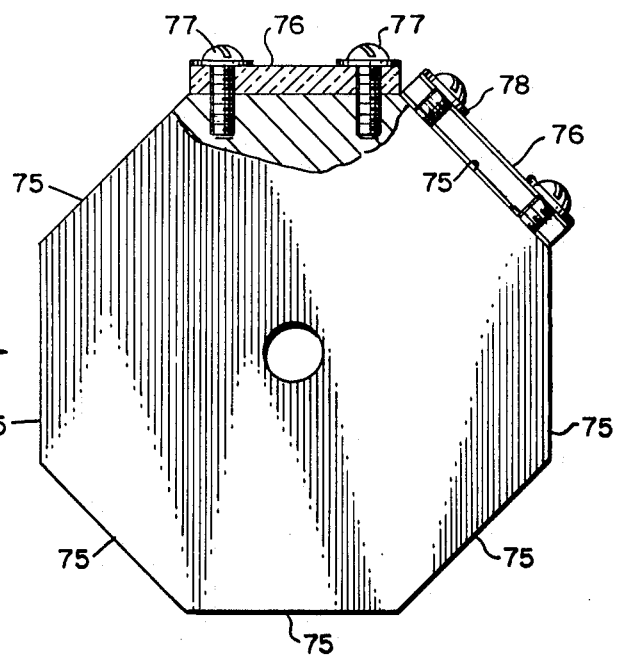
FIG. 10
FIG. 12
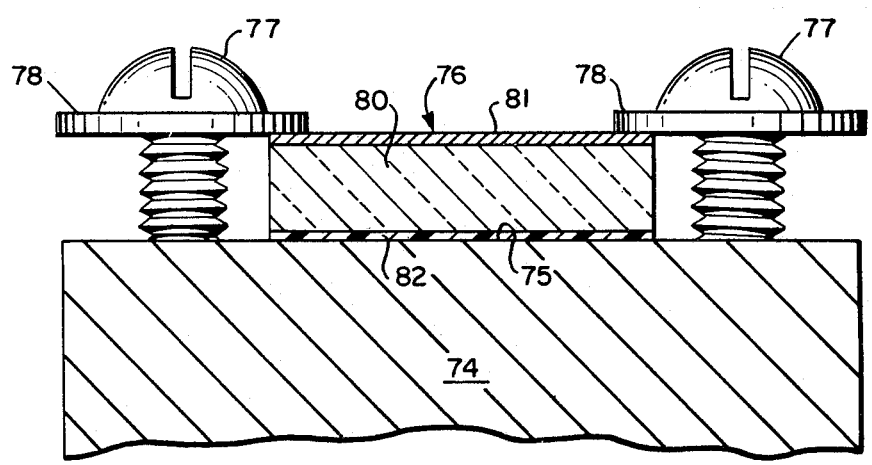

LABELS AND LABEL READERS

This is a division, of application Ser. No. 175,672, filed Aug. 27, 1971.

BACKGROUND OF THE INVENTION

This invention relates to label readers and labels therefore, and more particularly to binary coded concentric-ringed labels and scanning label readers for concentric-ringed labels.

With the increasing popularity of large discount department stores having a single-point of sale for many various departments and increasingly large inventory monitoring requirements for manufacturing outlets, retail supermarkets, warehouses, etc., the need for apparatus capable of recording each and every item that is sold has become evident. The field of use is not limited, however, and the development of equipment which allows individual placement on a multitude of objects of a specific code which represents price, inventory number, destination, address, routing, flight number, security information, etc., and then reading the particular code, permits the automation of sales data accumulation, the driving of electronic cash registers, the automation of inventory control, and the automatic routing and sorting of packages, boxes, mail, baggage, and all other materials to which a code is secured. Many devices have been developed and tested in an attempt to make inroads into this ever-expanding field, but these systems have various inherent drawbacks preventing their widespread use.

The major disadvantage with most of the label-reading machines known in the prior art is the requirement for orientation or positioning of the label relative to the reader or vice-versa. This orientation requirement makes the use of the label cumbersome while increasing the handling time. As a result, these systems are generally used only in special circumstances. Another common problem is the requirement for relatively expensive labels which are affixed to each item. Most of these labels require either retro-reflective strips or ink, fluorescent ink, or various colors to properly code the label. Furthermore, virtually all of the labels used in the prior art require expensive readers and are not capable of being prepared by truly cheap and portable label imprinters.

In the few systems which are capable of employing inexpensive labels, the cost of using the system becomes prohibitively expensive since sales personnel are required to initiate and/or operate the label-reading device manually in order to provide the desired information. As a result, the prior art label readers and the labels therefor have not been employed in the areas where there is a great need for such equipment, such as inventory control, sales accounting, material handling or shipping systems involving a large number of relatively inexpensive items, such as retail food supermarkets, manufacturing, military warehouses, drug distribution centers, parcel post, etc.

OBJECTS OF THE INVENTION

Therefore, it is a primary object of this invention to provide a label reader and a label therefor which does not require orientation or positioning of one relative to the other, the label being readable upon traversing exposure to the label reader in any label orientation.

Another object of this invention is to provide the label reader and label therefor as defined above which operates efficiently with expensive labels and a simple label reader, or with less expensive labels and a more complex label reader.

Another object of this invention is to provide the label reader and labels therefor as defined above that operate completely automatically.

Another object of this invention is to provide a label as defined above which substantially eliminates false or erroneous readings.

Other and more specific objects will be apparent from the features, elements, combinations and operations procedures disclosed in the following detailed description and shown in the drawings.

SUMMARY OF THE INVENTION

The label and label reader of this invention obviate the disadvantages found in prior art systems while being inexpensive to employ and maintain. The cost of labels are held to a small fraction of a cent by using coded concentric rings printed on the label without expensive inks or colors. An inexpensive label reader is provided by the development of a reader that eliminates fragile and expensive lenses or other optical and mechanical components and instead merely employs relatively inexpensive optical and digital components. The substantial cost benefit which can be realized in such areas as inventory control by the use of the system of this invention will also benefit consumers by providing the capability for retail price reductions.

In the preferred embodiment, the label incorporates concentric white and black rings of uniform width that can be arranged in binary code to display any desired information. The concentric ringed label provides a unique advantage over most prior art labels since it has no preferred reading orientation. This eliminates reader handling by the operator and substantially reduces the time involved in reading the label. A complete scan substantially through the center of the label will read the label code regardless of the point on the outer circumference of the label where the scan commenced.

The binary code information displayed on the label is read by a continuously scanning light beam which scans the label as the label passes over a narrow scanning slit, formed as part of the reader housing. The label reader is adapted to read the scanned label information continuously across nondiametric chords of the label, as the label's chords are exposed to the scanning slit, to decode and translate the data into digital signals, to record the digital signals, and discard these recorded sognals until the label reader has scanned across a diameter of the label. This complete scan information is then transferred to data storage or a computer interface, or is decoded to provide control signals.

A complete coded signal is only read from the label when the label reader has scanned substantially across the diameter of the label. All prior and subsequent scans provide only partial information and do not necessarily provide the entire information desired. Consequently, the label reader is adapted, using relatively inexpensive electrical equipment to, continuously receive partial information scans, discard the scans, receive the desired scan with the complete coded information, recognize this scan as the desired one, and send the information to data storage. As used herein, the term label is intended to mean any configuration of data in accordance with the present invention, and not merely a physically attachable label.

In the preferred embodiment, the label reader incorporates a coherent light beam source, preferably a laser beam, and projects the beam of light onto a rotating mirror drum having a plurality of reflecting surfaces. The rotating mirror is positioned below the scanning slit over which the label is passed to provide scanning movement of the light beam across the label surface. As the mirror drum rotates, the light beam scans across the slit until the beam now reflects off another drum surface starting a new beam at the beginning of the slit. The light beam passes through a restricted aperture to assure that the light beam will scan only from one end of the narrow slit to the other.

As the label and the goods to which the label is attached pass over the narrow slit, the scanning light beam causes a flash of label-reflected light to be generated when the beam hits the white circles while substantially no light flash is generated as the beam passes across the black circles. These flashes of light are conducted by a light pipe to impinge upon a sensor positioned within the label reader.

In order to assure that the flash of light is properly recorded by the sensor, the surrounding light pipe walls which are located between the scanning slit and the sensor, preferably, all incorporate mirrors. These peripherally surrounding highly reflective surfaces capture and direct the reflected light to provide a uniform signal at the base of the light pipe, assuring proper stimulation of the sensor.

The label flash sensor is part of a label information assembly which comprises relatively inexpensive digital components which are adapted to convert the sensor output into a digital signal, determine whether or not the signal represents the complete label information which would represent a scan substantially along the diameter of the label, and transmit the complete information signal to data storage.

The labels required for properly displaying the desired coded information for efficient reading by the label reader do not require retro-reflective strips or ink, fluorescent inks, or colors. Inexpensive grade paper, easily printed with black and white concentric rings, performs effectively in the system of this invention. If desired, a single retro-reflective center dot can be employed to reduce the digital components necessary to recognize the center scan of the label.

The digital components which are used for the label information assembly comprise five basic units. First, the information assembly incorporates a system reset unit which places the associated equipment into an information receipt mode after an object bearing a label has cleared the scanning slit or after a label reading has been completed. Next, as the label is being scanned, a label reflectivity decoder receives the flashes from the label and in cooperation with a shift pulse generator converts the first and second symmetrical portions of label signal output into a digital signal, which is stored in two shift register units for comparison.

A label information transfer unit determines when a scan has been made substantially across the diameter of the label by comparing the signals stored in the two shift registers for equality, and analyzing each scan or successive pairs of scans for satisfaction of certain conditions which are present only with a label diameter scan. When a label diameter scan is confirmed, a data ready signal is initiated to shift the signal from the registers to a data transfer interface.

The invention accordingly comprises the features, elements, combinations and operating procedures hereinafter disclosed, and the scope of the invention will be indicated in the claims.

THE DRAWINGS

For a fuller understanding of the nature and objects of the invention, reference should be had to the following detailed description taken in connection with the accompanying drawings, in which:

FIG. 6 is a timing diagram for the label information assembly of FIG. 5, when scanning along a diameter of the label of FIG. 1;

Figure 2:
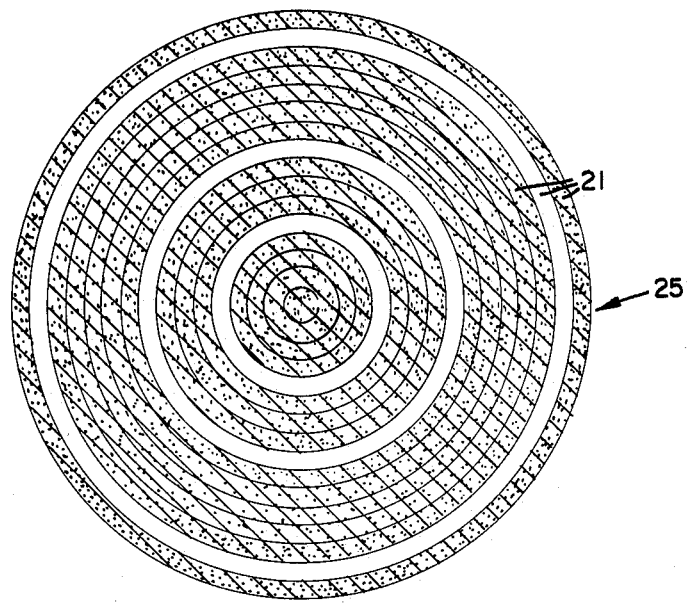
FIG. 2 is a plan view of another embodiment of the label of this invention.
Figure 3:
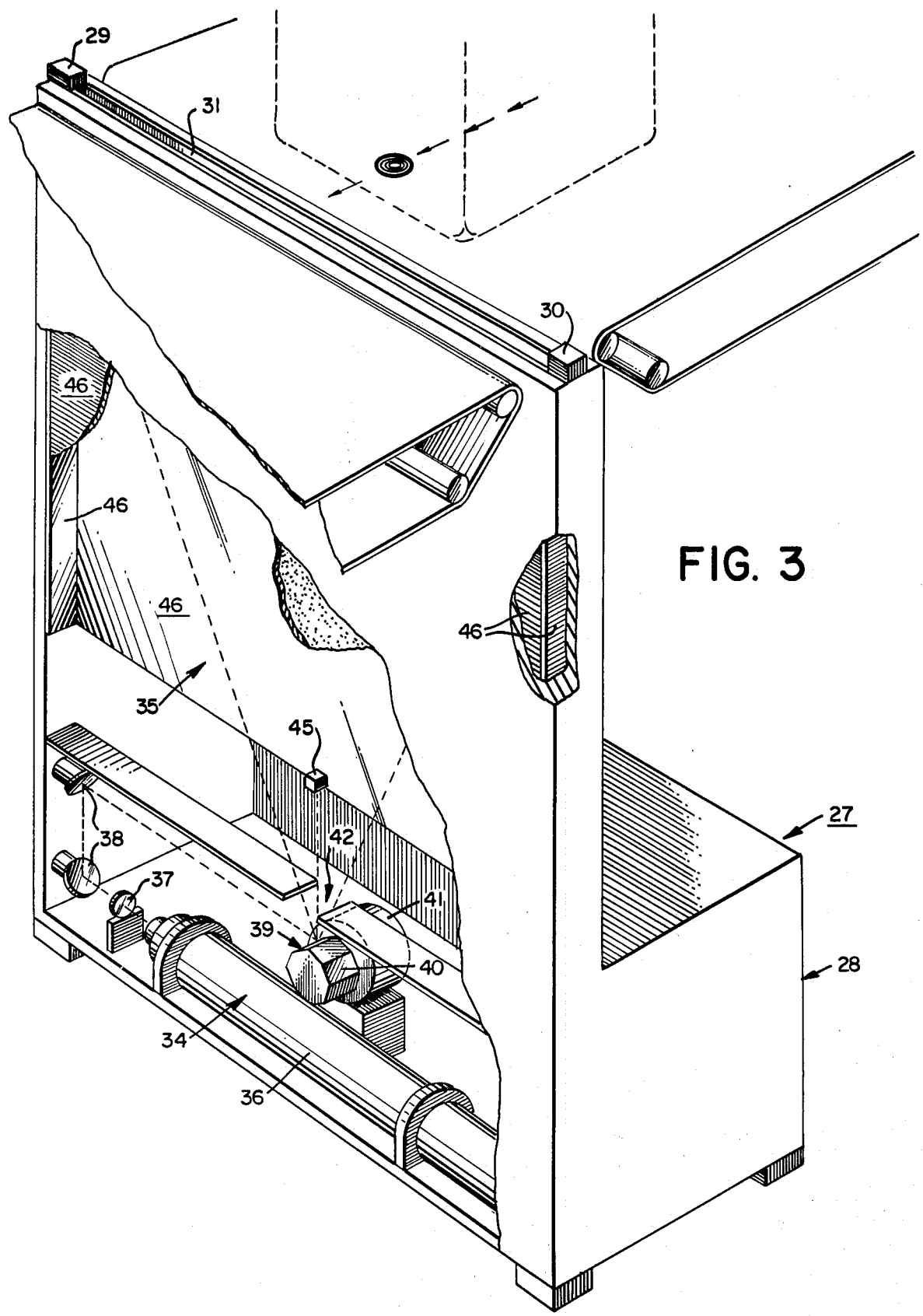
FIG. 3 is a perspetiive view partially broken away of the label reader of this invention.
Figure 4:
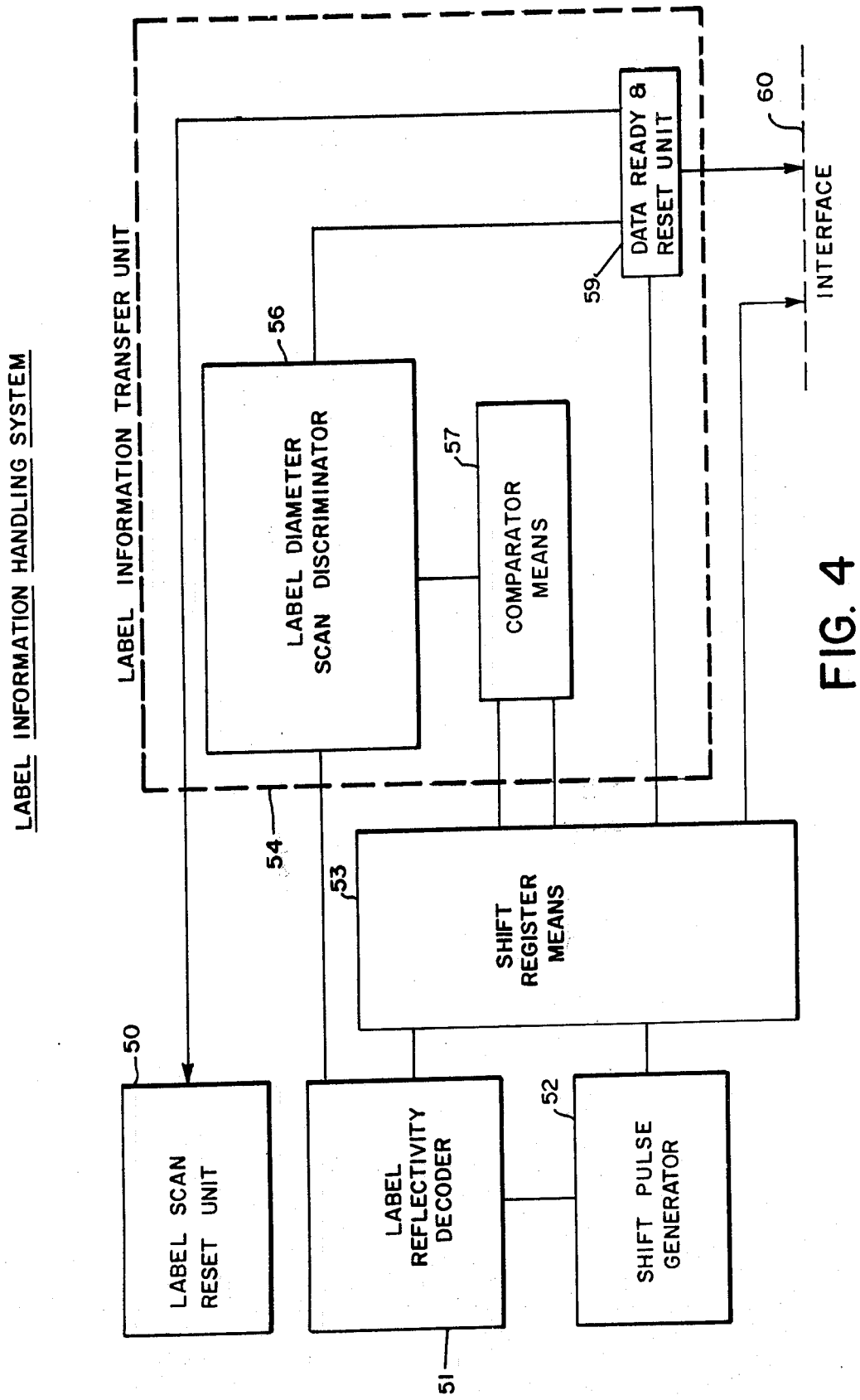
FIG. 4 is a block diagram of the label information assembly according to this invention.
Figure 9:
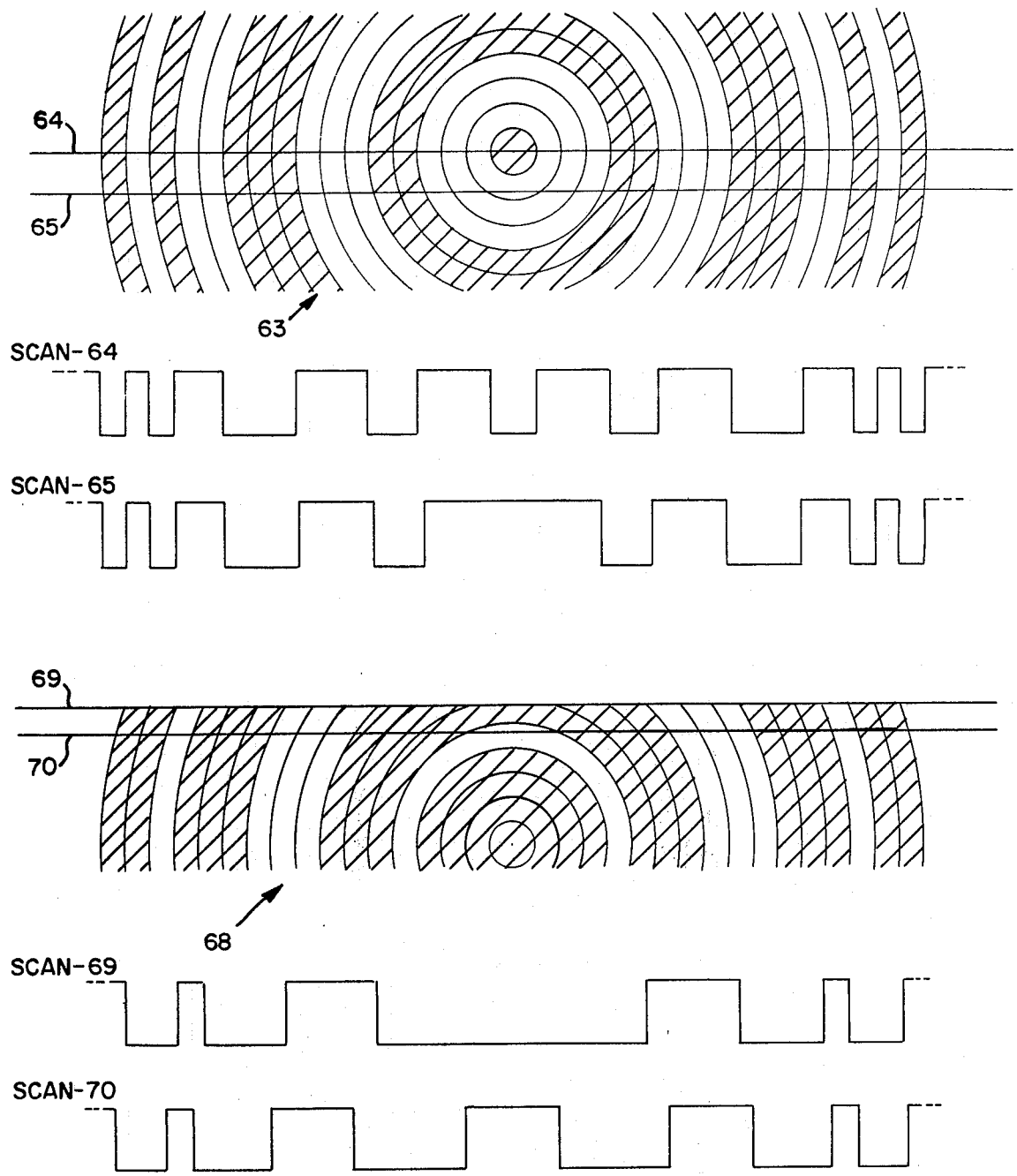

FIG. 7, comprising FIGS. 7A and 7B, is a detailed electrical circuit diagram of a second embodiment of the label information assembly of FIG. 4;

FIG. 8 is a timing diagram for the label information assembly of FIG. 7, when scanning along a diameter of the label of FIG. 2;

FIG. 9 is a diagramatic view of label sections with timing diagrams for selected label scans;

FIG. 10 is an enlarged side view of the mirror drum of the label reader of FIG. 3;

FIG. 11 is a top view of the mirror drum of FIG. 10; and

FIG. 12 is a greatly enlarged cross-sectional side elevation view of the mirror drum taken along line 12—12 of FIG. 11.

LABEL WITH HIGHLY REFLECTIVE INNER DOT

Figure 1:
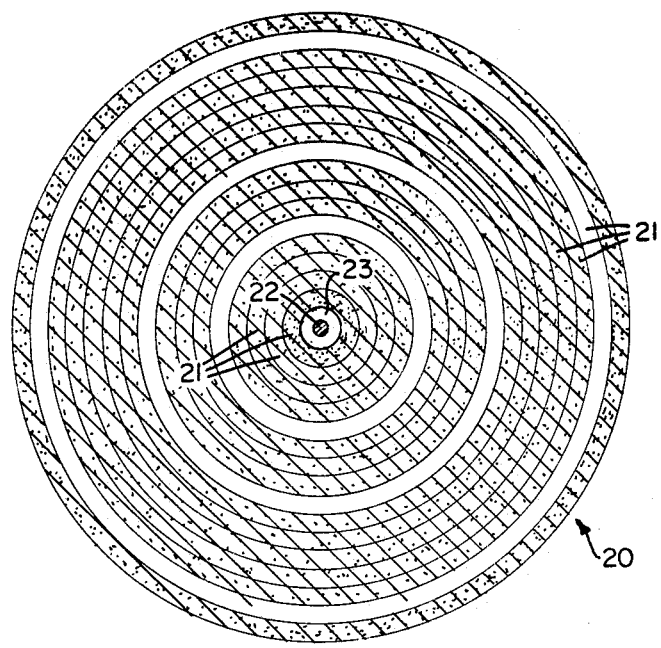
FIG. 1 is a plan view of one embodiment of the label of this invention.

In FIG. 1, one embodiment of the label of this invention is presented. In this embodiment, label 20 comprises sixteen equal width concentric rings 21 which are either black or white in color and a seventeenth center circle ring 23 which is white in color. Within center circle 23 is located a more highly-reflective inner dot 22.

The desired information is coded on label 20 in binary form with the black rings representing the binary number 0 and the white rings representing the binary number 1. Although the pure binary code is often preferred for information-packing, the functioning of the system is not dependent on the coding used on the label. Therefore, any coding scheme such as the American Standard Code for Information Interchange (ASCII), or any of the many decimal codes, error detecting codes, and error correcting codes commonly used may be employed.

Since rings 21 are concentric, the label is capable of being read by transverse scanning or irradiation from any direction, with the coded information being properly displayed whenever the label is read along any diameter. Although the scanning or irradiation apparatus can take several different forms, substantially all such means must incorporate a source of radiation, which impinges on the concentric rings of the coded label, and a reflectivity level sensor for detecting the reflectivity level of the concentric rings and transmitting a representative signal therefor. The irradiation reading of the concentric rings of the coded label can be performed mechanically, electrically, or optically. Mechanical irradiation is achieved by the relative movement of the radiation beam and the label, by moving the beam across a stationary label, by moving the label across a stationary beam, or by independently moving both the label and the beam.

Electrical irradiation reading is obtained by a network of sensors adapted to detect the reflectivity levels of the concentric rings of a moving or stationary coded label, and to transmit the desired signal. Optical irradiation reading is also applicable to both moving and stationary labels and is achieved by delivering the radiation reflections of the individual concentric rings to one or more sensor/transmitters. It should be apparent to one skilled in the art that many combinations of mechanical, electrical and optical irradiation reading means are possible without departing from the scope of this invention.

The label is completely free of orientation or positioning requirements. Using seventeen concentric equal width rings and the binary coding system, there are $2^{17}$ possible combinations or 131,072 different coding combinations for the black or white rings. The 17 bit binary number, which can represent the decimal number 1 through 131,072, can be readily translated to a decimal number either in a computer or with digital decoding logic.

The label, however, is not limited to 17 equally spaced rings and any desired number of rings can be employed. Theoretically, the radial width of each concentric ring need only be as large as the diameter of the beam at its maximum defocused point along the scanning plane. Unfortunately, practical considerations impose substantial limitations on the theory. One of the ultimate factors to be considered is the environmental conditions under which the label is read. If high vibrations are present, the radial width of each label must be wide enough to prevent any vibration induced scanning beam oscillation from scanning beyond the boundaries of the particular ring being scanned. Otherwise, erroneous code reading will result.

Along with the desired size label required for the particular application, the speed with which the label will be passed over the reader and/or the number of non-coded center rings allowable must also be considered in determining the radial width of the rings, when the system is operating at a given scanning speed. For most applications, and under most conditions, 14–40 concentric rings are considered to meet fully the coding requirements while also being capable of error-free reading.

By increasing the number of equally spaced concentric rings, the number of different possible combinations increases exponentially. For example, with 20 equally spaced rings, there would be $2^{20}$ or 1,048,576 different combinations, while with 24 equally spaced rings there would be $2^{24}$ or 16,777,216 combinations or sufficient representations for the decimal numbers 1 through 16,777,216. The number of concentric rings employed, the radial width of each concentric ring, and the diameter of the label are all variable sizes which can be selected for the particular application for which the label will be used.

While concentric rings which are either black or white in color are preferred, any color rings having contrasting radiation reflectivity levels can be used. Furthermore, concentric rings having a plurality of different reflectivity levels can also be employed. For simplicity, however, two contrasting colors and the binary coding system are preferred.

Inner dot 22, which is located within center circle 23, of label 20 comprises a material having a reflectivity level that is several times greater than the white portion of the label or the highest reflectivity level of the concentric rings. Preferably, inner dot 22 comprises a non-glossy material in order to insure that the reflected light is uniformly scattered. Furthermore, in this embodiment of the invention, center circle 23, having a radius equal to the radial width of rings 21, is not used for information storage. Instead, center circle 23 is preferably coded white in order to prevent the anomaly of having a high reflectivity level sensed during a black or non-reflective ring scan.

Although not required, retro-reflective materials can be employed for inner dot 22. Retro-reflective materials which have been successfully used are Scotch-Lite brand reflective sheeting, described in 3M Company product bulletin 85-4; and the Reflective Liquids described in 3M Company Information Folder No. 100 and Information Folder No. 100A.

Label 20 may be printed on inexpensive white non-glossy paper, with the black concentric circles printed thereon with non-glossy ink. Inner dot 22 can be adhesively joined to the label or the label can be provided with a center hole and adhesively joined to the reflective material. If reflective liquids are employed, inner dot 22 can be silk-screened, printed, or painted onto the paper stock. Also, reflective sheet stock can be used with label 20 formed by printing the coded concentric rings directly on the reflective paper with no printing where the inner dot is to be. If desired, label 20 may have an adhesive backing for easy application to any particular object.

LABEL WITHOUT HIGHLY-REFLECTIVE INNER DOT

Another embodiment of the label of this invention is shown in FIG. 2. Label 25 of FIG. 2 is very similar to label 20 of FIG. 1 in that both comprise a plurality of equal width concentric rings 21 which preferably incorporate two contrasting radiation reflectivity levels. Label 25 differs from label 20 in that label 25 does not incorporate an inner dot formed of retro-reflective or other high reflectivity material having a radiation reflectivity level that is several times greater than the highest reflectivity level of the concentric rings.

Label 25 merely comprises a plurality of equal width concentric rings 21 having different levels of reflectivity. As with label 20, the information coded on label 25 can be read along any of its diameters, thereby eliminating any requirement of orientation or positioning of the label. The major advantage of label 25 is its substantially lower cost since no center circle of high reflectivity is used.

In the preferred embodiments, each label 20 or 25 is individually coded using the binary system with each black ring representing the binary number 0 while each white ring represents the binary number 1. As discussed above, any number of concentric rings can be employed in order to provide a label which meets the requirements of the particular situation for which the label will be used.

Both labels 20 and 25 preferably appear on a plain background to reduce to zero the possibility of a false reading due to printing or designs on the background. Although the probability of this happening is very low, it is not zero. It is conceivable that the labels could be placed on a package with decorative bulls eye patterns with precisely the exact geometrical design to be interpreted as a coded label. The possibility of false readings due to the background involves no particular restriction in a situation where the labels are applied at the origin of manufacture as the background decoration can be easily analyzed and tested for the possibility of generating false readings. Furthermore, in situations where it is necessary to permit unrestricted use of the labels on any background, the probability of incorrect readings due to the background printing or decoration can be reduced to almost zero by the use of error detection and/or error correction codes on the label (at the expense of a slight reduction in the information capacity of the label).

Also, the labels of this invention essentially eliminate false or erroneous readings. Since only diameter scans are used and the probability of having dirt spots or other error producing marks symmetrically disposed about the label's center along the scanning path is extremely low, improper readings are almost impossible. It is more likely that soiled labels will produce no reading instead of a false reading. This is generally preferred since false readings are more difficult to trace and rectify than having no reading at all. Furthermore, as will be discussed below, any item bearing a label which is not read can be identified with the aid of a label scan reset unit. As a result the labels of this invention are powerful geometrically as well as statistically.

LABEL READER

In FIG. 3, the preferred embodiment of the label reader of this invention is shown. Label reader 27 comprises main housing 28 and two demountable housings 29 and 30. Extending between housings 29 and 30 is a narrow scanning slit 31, across which containers or objects bearing downward facing labels 20 or 25 are moved for label reading.

Housing 28 surroundingly encloses the beam scanning equipment 34, a light pipe 35, and the associated electronics. Beam scanning equipment 34 incorporates a coherent radiation beam source such as a small laser 36, a focusing lens 37, folding mirrors 38, and a beam scanner 39. In the preferred embodiment, beam scanner 39 comprises an octagonal shaped mirror drum 40, which is axially connected to synchronous driving motor 41.

As the coherent radiation beam impinges upon one of the mirror surfaces of mirror drum 40, the beam is reflected upwardly through an aperture 42 to a scanning slit 31. As motor 41 rotates mirror 40, the reflected beam scans across slit 31 from one end to the other end thereof. Aperture 42 is preset to provide a scanning beam which exactly coincides with the length of scanning slit 31. Once the reflected beam has scanned across the entire length of slit 31, the reflecting surface of mirror 40 will have rotated to a position where the radiation beam no longer impinges upon the surface and instead impinges upon the next mirror surface, causing a new beam to be reflected through aperture 42 to the front end of scanning slit 31. As a result, successive scanning beams continuously sweep across the entire length of slit 31, providing a scanning radiation source for impingement upon the concentric ringed label.

As best seen in FIG. 10, octagonal shaped mirror drum 40 comprises an octagonal shaped support 74 having eight substantially flat circumferentially disposed surfaces 75 with mirrors 76 in juxtaposed spaced relationship to surfaces 75 and secured to support 74. As can best be seen in FIGS. 11 and 12, mirrors 76 are secured to surfaces 75 by means of screws 77 and washers 78.

Referring to FIG. 12, mirror 76 comprises a glass base 80 with a reflecting material 81, such as silver oxide, deposited on the surface thereof. Interposed between mirror 76 and surface 75 of support 74 is a resiliently depressable adhesive 82. Adhesive 82 aids in holding mirror 76 to support 74 while also providing a resiliently depressable cushion for adjustment of the mirror pitch angle relative to support 74.

As support 74 continuously rotates about its central axis, the laser beam impinges upon one of the mirrors 76 and is reflected through aperture 42 and projected up to the scanning slit, (not shown). As support 74 rotates, mirror 76 similarly rotates causing the projected beam to sweep across aperture 42 and the scanning slit. When one of the mirrors 76 has rotated to a position where the laser beam no longer reflects off that surface, the following mirror will be in position to repeat the beam projection and sweeping operation.

In order to provide the desired scanning of the label, the projected laser beam must continuously sweep across the scanning slit through substantially the same plane. In order to assure sweeping movement of the beam in substantially the same plane, the angular relationship of mirrors 76 to support 74 are adjusted by means of screws 77 and washers 78. The ease of adjustment is enhanced by incorporating resiliently depressable adhesive 82 between the mirror 76 and surface 75 of support 74. Consequently, adjustment screws 77 and washers 78 quickly and easily allow the necessary angular adjustment required for mirrors 76 to be made, thereby assuring the required planer similarity of the beams scanning path.

As the scanning beam sweeps across scanning slit 31, the beam impinges upon the concentric rings of the label from one edge to the other edge thereof, as the label passes over slit 31. When the radiation beam impinges upon the black concentric rings, virtually no radiation reflection results. However, when the scanning beam sweeps across the white rings, a substantially greater radiation reflection is produced. Radiation reflectivity sensor 45, mounted to housing 28, produces a voltage output signal each time the higher radiation reflectivity of a white ring is sensed.

In order to aid sensor 45 in producing a voltage output signal whenever a white ring has been scanned, housing 28 is provided with light pipe 35 juxtaposed between slit 31 and sensor 45 to more completely direct and concentrate the radiation reflected from the white ring to sensor 45. In the preferred embodiment, light pipe 35 comprises a plurality of mirrors 46 which are peripherally mounted to the walls separatingly spacing sensor 45 from scanning slit 31. The incorporation of peripherally surrounding mirrors on all four of the substantially vertical walls separating scanning slit 31 from sensor 45 provides a narrow, elongated, rectangular light transmission tunnel which comprises parallel facing closely spaced reflecting surfaces, with perpendicularly disposed parallel facing reflecting end surfaces. It is believed that the radiation reflection produced when the scanning beam impinges upon a white concentric ring is captured by the light pipe 35 and internally reflected along a plurality of paths terminating randomly across the bottom of the light pipe, with a substantial portion of the reflected radiation impinging upon sensor 45, stabilizing or equalizing the signal-to-noise ratio across the entire length of scanning slit 31. The incorporation of light pipe 35 is extremely advantageous for aiding label reader 27 to accurately decode the label regardless of the position along the length of slit 31 over which the label passes.

Demountable housing 29 incorporates a sensor (not shown) while demountable housing 30 incorporates an adjustable mirror (not shown). The mirror is adjusted to reflect the laser beam to the sensor. As fully described below, when an object has passed between and beyond the line between housings 29 and 30, the impingement of the laser beam on the sensor causes the sensor to transmit a signal to a "data ready" unit which enables the information handling system to receive the next label scan.

INFORMATION HANDLING SYSTEM

A block diagram representing the electronic circuitry employed in the label reader of this invention for the proper handling of the coded label signal is shown in FIG. 4. The label information handling system comprises a label scan reset unit 50, a label reflectivity decoder 51, a shift pulse generator 52, shift register means 53, and a label information transfer unit 54. Label information transfer unit 54 incorporates a label diameter scan discriminator 56, comparator means 57, and a data ready and reset unit 59.

In operation, label scan reset unit 50 enables the label information handling system to receive reflected radiation corresponding to the differing reflectivity levels of the different concentric rings of a scanned label. Reset unit 50 is adaptable to several different arrangements. Most commonly, reset unit 50 is incorporated into the data storage unit and adapted to transmit a reset pulse as soon as the coded label information has been transferred to data storage. Another common arrangement is to incorporate beam transmitting and receiving means, such as photocells, in reset unit 50, which causes the label information handling system to be enabled whenever the beam is broken or else whenever the beam is restored. With either arrangement, the label information handling system will thus be ready to sense and properly process the reflectivity levels of the coded label, and if desired provide a warning signal whenever an item bearing a label has cleared the system without a complete label reading.

Label reflectivity decoder 51 senses the radiation reflectivity levels of the concentric rings of the label as the label is being scanned, shapes this scanned signal into a clean pulse voltage signal, and transmits the shaped voltage signal to shift register means 53. Label reflectivity decoder 51 incorporates a radiation reflectivity level sensor and a signal shaper. The sensor produces a voltage output representing the radiation reflectivity levels of the coded label, and transmits this scanned signal to the shaper. The shaper converts the scanned signal into a clean pulse voltage signal so that the radiation reflectivity levels are well defined. This shaped voltage signal is then transmitted to shift register means 53 for further processing.

Shift pulse generator 52 is connected to label reflectivity decoder 51 and shift register means 53 and provides clocking pulses thereto in order to assure the proper voltage signal transmission for each concentric ring of the label scanned. Shift pulse generator 52 incorporates a pulse generator and a pulse counter. The frequency of the pulse generator is selected for the particular label scanning speed and label ring width. The counter receives the pulses and is adapted to transmit a shift pulse at the pulse count which substantially coincides with the midpoint in time of the scan of each concentric ring. The shift pulse is transmitted to shift register means 53 to assure proper recording of the shaped voltage signal. Preferably, the counter is cleared with each voltage level change in the shaped voltage signal in order to assure the desired synchronism between shift pulses and the midpoint in time of the scan of each concentric ring.

In the preferred embodiment, shift register means 53 incorporates two series-connected shift registers with each register incorporating storage cells equal to the number of equal width concentric rings displayed on the scanned label. As described above, the coded label information will be completely read when a scan has been made substantially along any diameter of the label. As a result, when this type of diametric scan has been made, the label code will be read twice, one complete reading per radius, and the shift registers will each have identical information stored therein, with the cells of the second shift register containing the coded label information from the first or inward radius portion of the scan.

Label information transfer unit 54 receives the shaped voltage signal, which represents the coded label information, and must determine whether or not this shaped voltage signal represents the entire label information desired. As a label advances over the label reader, the label is continuously scanned, with the coded information being sent to the label information transfer unit 54. However, the early scans of a label do not contain the entire coded information of the label since these scans are merely taken along successive parallel chords of the label. It is not until a scan is made substantially along a diameter of the label that the entire label information will be recorded.

Label information transfer unit 54 determines when the entire label information is recorded by establishing two conditions which must be met before the information stored in the shift register means 53 will be transferred to data handling interface 60. As mentioned above, when the entire label information has been read, the two shift registers of shift register means 53 will contain identical information. Therefore, label information transfer unit 54 incorporates comparator means 57 which provides a positive comparison signal when the shift registers of shift register means 53 both contain identical information. Since it is possible that coincidence will allow the two shift registers of shift register means 53 to have stored therein identical signals without having a scan substantially along a diameter of the label, label information transfer unit 54 incorporates a label diameter scan discriminator 56, which receives the positive comparison signal and further analyzes the particular scan for determination of a label diameter scan.

DISCRIMINATOR FOR HIGH-REFLECTIVITY INNER DOT LABELS

The type of discriminator 56 employed in a particular transfer unit depends upon the type of label being scanned. If label 20 incorporates an inner dot, comprising a material having a radiation reflectivity level substantially higher than the radiation reflectivity levels of the concentric rings, discriminator 56 basically comprises a voltage detector and an AND gate. The voltage detector receives the voltage signal representing the radiation reflectivity levels of the concentric rings of the label and is responsive to the substantially higher voltage signal produced by the significantly higher reflectivity of the center circle material. In response to this high level voltage signal, the voltage detector transmits a positive label diameter signal to the AND gate, which in turn transmits a positive data ready signal only when the positive comparison signal is also present.

DISCRIMINATOR FOR LABELS WITHOUT HIGH REFLECTIVITY INNER DOTS

When the less expensive labels 25 which do not incorporate an inner dot comprising the higher reflectivity material are employed, moving across scanning slit 31, the label diameter scan discriminator 56 comprises substantially more involved logic apparatus. Upon receipt of the positive comparison signal from comparator means 57, discriminator 56 compares consecutive scans to each other, and will transmit a positive label diameter scan data ready signal only when certain conditions have been met by the consecutive scans. Discriminator 56 compares each successive pair of consecutive scanning signals for (1) the overall number of voltage level transitions, and (2) the number of similar voltage level-producing concentric rings at the label's center. When the number of similar voltage level concentric rings scanned at the center of the label is less in the second signal of the pair than in the first signal and the number of voltage level transitions in the second signal of the pair has not increased or when the number of voltage level transitions in the second signal of the pair has decreased, the first signal of the pair must be a label diameter scan. When these conditions are met, label diameter scan discriminator 56 transmits a positive label diameter scan data ready signal to data ready and reset unit 59.

Since discriminator 56 employs pairs of two successive label scans to determine the label diameter scan and the desired scan resulting from the discriminator analysis is the previous scan, shift register means 53 must incorporate a third register which will store the square wave voltage level signal from the preceding scan while the other two shift registers store the following square wave voltage signal.

The positive data ready signal from discriminator 56 is transmitted to data ready and reset unit 59, which in turn transmits a data transfer signal to initiate the transfer of the data from shift register means 53 to data handling interface 60. The data handling interface can be connected to a data storage unit or data processing unit for use of the available data in any desired manner.

LOGIC CIRCUITRY OF FIG. 5 FOR HIGH-REFLECTIVITY INNER DOT LABELS

Figure 5:
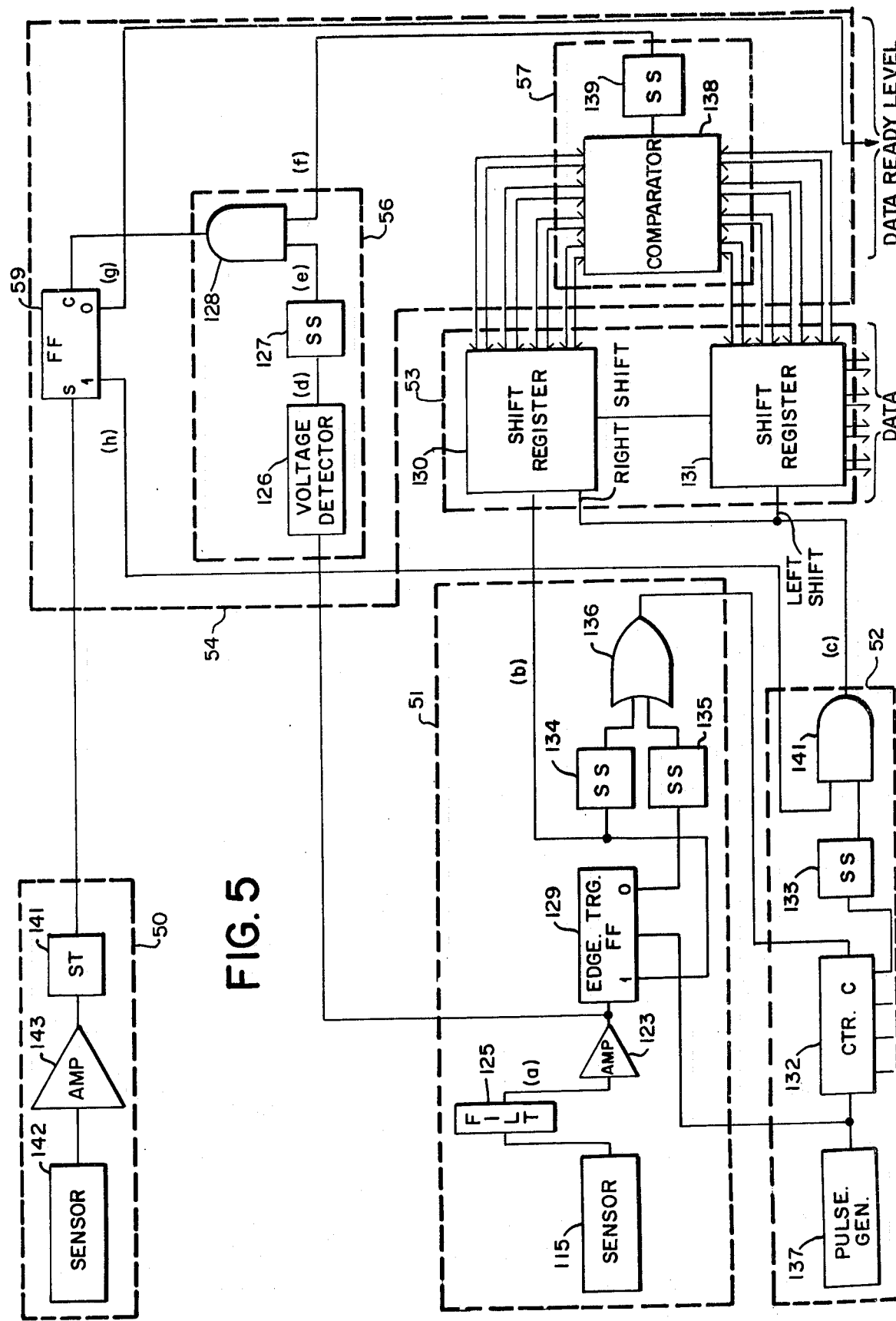
FIG. 5 is a detailed electrical circuit diagram of one embodiment of the label information assembly of FIG. 4.

A detailed logic circuit diagram of the label information handling system of this invention for use with labels having the highly reflective material as the center circle is shown in FIG. 5. In this embodiment, label scan reset unit 50 comprises a sensor 142, an amplifier 143, and a single shot one pulse generator 141. Label reflectivity decoder 51 comprises a reflectivity level sensor 115, a 120 CPS notch filter 125, to eliminate fluctuation in light intensity of artificial background light operating on 60 CPS A.C., an amplifier 123, a flip-flop 129, two single shot one pulse generators 34 and 35, and an OR gate 36. Shift pulse generator 52 comprises a pulse generator 137, a counter 132, a single shot one pulse generator 33, and an AND gate 141. Shift register means 53 comprises shift registers 30 and 31.

Since this embodiment of the label information handling system is preferably employed with the label having the highly reflective material at the center thereof, the label information transfer unit 54 is substantially simplified. The label diameter scan discriminator 56 of transfer unit 54 comprises voltage detector 126, single shot one pulse generator 127, and AND gate 128. Comparator means 57 comprises comparator 138 and single shot one pulse generator 139. The remainder of label information transfer unit 54 merely comprises a data ready and reset flip-flop 59.

OPERATION

During continuous label scanning operation, the data-ready and reset flip-flop 59 will remain in the cleared condition until set by the single-shot one pulse generator 141 triggered by the sensor 142 of the label scan reset unit 50 through amplifier 143. A sensor adaptable to this application is the Electro-Nuclear Laboratories, Inc. type SDA-004. A one pulse generator adaptable to the application is a Schmidt Trigger, such as Texas Instruments' SN 74121 described on pages 2–38 and 2–39 of their Catalog CC 201. As described above in this embodiment, the presence of an object over the narrow reading slit will prevent the laser beam directed by the folding mirror from reaching the sensor 142. When the object has passed over the reading slit, the sensor 142, amplifier 143, Schmidt Trigger 141 act to set flip-flop 59, and the label reader is ready to read another label.

With the label information handling system ready, the laser beam scans across a chord of the label with the reflected light scattering uniformly in all directions. The reflection produced is sensed by reflectivity level sensor 115 and transformed into a voltage output signal. The signal at the output of the amplifier 123, as a result of the laser beam scanning the label through the center, after the detection of the variations in reflected light by sensor 115 and the filtering of 120 cycle fluctuation of artificial background light by filter 125, is shown in diagram (a) of FIG. 6.

One sensor adapted to this application is the type SDA-004 silicon photodiode/operational amplifier combination built in a single TO-5 package supplied by Electro-Nuclear Laboratories, Inc., Menlo Park, California. The silicon photodiode type sensors will detect very small variations in light intensity in the presence of extremely bright background light. Artificial background light such as incadescent or fluorescent light operating on 60 cycles A.C. introduces 120 cycles fluctuations in light intensity in addition to the variations from the reflected laser beam. The fluctuations from the artificial light can be filtered out with notch filter 125 leaving only the variations due to the reflected laser beam. One filter adapted to this application is the APN 120, 120 cycle notch filter supplied by AP Circuit Corporation, New York, New York.

The highly reflective material of the inner dot of the label results in an increased amplitude in voltage 122 of FIG. 6 at the amplifier 123 output as the laser beam scans over this portion of the label. A voltage detector 126 is utilized to indicate this increased amplitude indicating the beam is scanning the label near its center. Voltage detector 126 can be of a type in common use shown in the upper portion of page 45 in First Edition (Sixth Printing) of Handbook of Operational Amplifiers published by Burr Brown Research Corporation, Tucson, Arizona, 1963. The threshold voltage of voltage detector 126 is set at some safe point above normal signal voltage levels of the white portion of the label. When the threshold voltage of the voltage detector has been exceeded, the voltage detector triggers a single shot one-pulse generator 127 whose width is adjusted to be slightly longer than the time required to scan one-half the label through the center. The output of the voltage detector is shown in diagram (d) of FIG. 6. The output of single shot 127 is shown in diagram (e) of FIG. 6. The output of the single shot enables the AND gate 128 for a purpose to be explained later. A single shot adaptable to application in this device is the Texas Instruments SN 74121 described on pages 2–38 and 2–39 of Texas Instruments' Catalog CC 201.

The edge triggered flip-flop 129, clocked by the pulse generator 137, continuously monitors the analogue signal at the output of the amplifier and is set and cleared in conformance with the 1 and 0 signals from the label. The output of the 1 side of edge triggered flip-flop 129 is shown in diagram (b) of FIG. 6. An edge triggered flip-flop adaptable to this application is the Texas Instruments SN 7474 described on pages 2–32, 2–33, and 2–34 of their Catalog CC 201.

The (i) side of the edge triggered flip-flop 129 provides the signal input to the shift register 130 and shift pulses are generated by counting down the pulse generator 137 with the counter 132 and triggering the single shot 133 so that the shift pulse occurs at the midpoint in time of the scan of each of the equal width concentric rings. The shift pulses are shown in diagram (c) FIG. 6. A shift register circuit adaptable to this application is the Texas Instruments SN 7495 described on pages 9–25, 9–26, 9–27, 9–28, 9–30, and 9–31 of their Catalog CC 201. A counter adaptable to this application is the Texas Instruments SN 7493 described on pages 8–13, 8–14, 8–15, 8–16, and 8–17 of their Catalog CC 201.

The single shots 134 and 135 through OR gate 136 provide a clear pulse to the counter 132 every time there is a transition from black to white or white to black on the label so that at any transition on the label the counter 132 is cleared to all zeros.

With the counter 132 initially cleared to all zeros, the fourth stage of the four stage counter 132 will go to the one state at the count of eight and trigger the single shot 133 to produce a shift pulse. The frequency of the pulse generator 137 is set so that the counter 132 reaches the count of eight at the midpoint in time of the scan of each equal width concentric ring. The frequency of the pulse generator 137 will be a function of the scanning speed and the width of the concentric rings. If no transition occurs in the label, the counter 132 will continue to count and, after 16 more pulses, will trigger the single shot 133 to produce a shift pulse at the midpoint of the next ring. The shifting of the label code into the shift register 130 will continue in this manner on a dead reckoning basis until a transition occurs in the label.

When the laser beam has completed a scan through the center of the label, the two shift registers 130 and 131 will contain identical binary numbers; the single shot 127 will have been triggered by the voltage detector 126 as a result of the highly reflective inner circle of the label enabling AND gate 128; the comparator 138 will indicate equality, triggering single shot 139 (shown in diagram (f) in FIG. 6), which clears flip-flop 59 through the enabled AND gate 128; the cleared flip-flop 59 in turn inhibits AND gate 141, which prevents any further shifting of the shift registers 130 and 131 and also indicates by the data ready level that the binary number from the label is now ready to be transferred from the shift register 131 to the computer or interfacing equipment. The 0 side of flip-flop 59 (data ready level) is shown in diagram (g) in FIG. 6. The 1 side is shown in diagram (h) in FIG. 6. A comparator adaptable to this application is Texas Instruments' SN 74L85 described on pages 11–1, 11–2, 11–3, 11–4, 11–5, 11–6, and 11–7 of their Catalog Supplement CC 301.

In summary, two conditions are required by this device for the label to be read (data ready level high). The label must have been scanned through the inner circle 22 and the contents of the two shift registers 130 and 131 must be identical. The requirement for equality between the shift registers is arbitrary in the sense that the label could be read without imposing this requirement. The requirement for equality reduces the probability of error in reading a label because it requires that the code in the label be read twice in the same scan and that these readings be identical.

There is a very rich potential of variations on this basic invention such as the requirement for equality in two shift registers 130 and 131 as described earlier, the means of setting flip-flop 59, monitoring the number of objects sensed and the number of labels read and comparing them to insure the presence of a label on every object passing over the slit, variations in the size of center and inner circles, etc. which have not been described.

DIAMETER OF LABEL INNER REFLECTIVE DOT

It can be seen from diagram (b) of FIG. 6 showing the output of edge triggered flip-flop 129 and diagram (c) of FIG. 6 showing the shift pulse, that because the code signal is sampled exactly in the middle under ideal conditions, i.e. when the beam is scanning directly through the center of the label, some departure from the ideal is permissible. As long as the code signal or a series of like code signals, 1's or 0's, is not foreshortened or lengthened, by more than one-half of an ideal code signal time, the code in the label will be correctly read. This means that the label need not be scanned exactly through the center for a correct reading. The most severe foreshortening effect, when the label is not scanned exactly through the center, occurs at the center circle when the next adjacent outer ring is black or 0. As long as the foreshortening of the center circle is less than one-half a binary code time, the label can be correctly read, and this along with the consideration of the sharpness of the focusing of the laser beam by the lens and the foreshortening of the code times at the extreme lateral positions on the scanning slot, determine the diameter of the reflective inner dot 22, shown in FIG. 1. If desired, the radius of the center circle can be enlarged to the equivalent of two or more equal width code rings, which in turn permits an increase in the diameter of the reflective inner dot, which increases the distance from the center of the label at which a scan can be made for a correct reading. This has the effect of increasing the speed at which the label can be moved across the scanning slot with a given number of scans/second, since the label must move across the slot at a speed that permits at least one scan across the reflective inner dot.

Logic Circuitry of FIG. 7 for Labels Without Highly Reflective Inner Dot

The more involved logic circuitry for the handling of coded labels which do not incorporate an inner dot having a highly reflective material therein is shown in FIG. 7. As with the previously described embodiment, label scan reset unit 50 comprises a sensor 267, an amplifier 268, and a one pulse generator 266. Also, label reflectivity decoder 51 comprises a reflectivity level sensor 215; a filter 220; an amplifier 219; a flip-flop 221; single-shot, one pulse generators 30 and 31; and an OR gate 32.

Shift pulse generator 52, in this embodiment, comprises a pulse generator 222; counters 224 and 240; a comparator 225; a mechanical register 226; a flip-flop 227; single-shot, one pulse generators 228 and 242; AND gates 237, 238 and 241; and an OR gate 239. Shift register means 53 comprises a shift register 223 in series with a shift register 233 which is connected in parallel to a register 260.

Comparator means 57 of label information transfer unit 54, as with the previous embodiment, comprises a comparator 234 and a single-shot, one pulse generator 235. The remainder of label information transfer unit 54 requires the majority of the increased circuitry to provide the label signal analysis required. Label diameter scan discriminator 56 comprises timing pulse delay units 243 and 244; a shift register 255; a MOD2 ADDER 254; counters 245 and 251; comparators 261 and 262; registers 256 and 257; inverters 248 and 271; AND gates 250, 252, 258, 263 and 264; flip-flop 236; and OR gates 249 and 265. Flip-flop 59 comprises the data ready and reset unit.

Operation

During continuous label scanning operation, the data-ready and reset flip-flop 59 will remain in the cleared condition until set by the single-shot, one pulse generator 266 triggered by the sensor 267 of the label scan reset unit 50 through amplifier 268. A sensor adaptable to this application is the Electro-Nuclear Laboratories, Inc. type SDA-004. A one pulse generator adaptable to the application is a Schmidt Trigger, such as Texas Instruments' SN 74121 described on pages 2–38 and 2–39 of their Catalog CC 201. As described above, in this embodiment, the presence of an object over the narrow reading slit will prevent the laser beam directed by the folding mirror from reaching the sensor 267. When the object has passed over the reading slit, the sensor 267, amplifier 268, Schmidt Trigger 266 act to set flip-flop 59, and the label reader is ready to read another label.

With the label information handling system ready, the laser beam scans across a chord of the label with the reflected light scattering uniformly in all directions until a scan is made substantially along a diameter. The reflections produced are sensed by reflectivity level sensor 215 and transformed into a voltage output signal. The signal at the output of the amplifier 219, as a result of the laser beam scanning the label through the center, after the detection of the variations in reflected light by sensor 215 and the filtering of 120 cycle fluctuation of artificial background light by filter 220, is shown in diagram *a* of FIG. 8.

One sensor adapted to this application is the type SDA-004 silicon photodiode/operational amplifier combination built in a single TO-5 package supplied by Electro-Nuclear Laboratories, Inc., Menlo Park, California. The silicon photodiode type sensors will detect very small variations in light intensity in the presence of extremely bright background light. Artificial background light such as incandescent or fluorescent light operating on 60 cycles A.C. introduces 120 cycle fluctuations in light intensity in addition to the variations from the reflected laser beam. The fluctuations from the artificial light can be filtered out with notch filter 125 leaving only the variations due to the reflected laser beam. One filter adapted to this application is the APN 120, 120 cycle notch filter supplied by AP Circuit Corporation, New York, New York.

The edge triggered flip-flop 221 clocked by the pulse generator 222 continuously monitors the analogue signal at the output of the amplifier and is set and cleared in conformance with the 1 and 0 signals from the label. The output of the 1 side of edge triggered flip-flop 221 is shown in diagram (b) of FIG. 8. An edge triggered flip-flop adaptable to this application is the Texas Instruments type SN 7474 described on pages 2–32, 2–33, and 2–34 of their catalog CC 201.

The 1 side of the edge triggered flip flop 221 provides the signal input to the shift register 223. Shift pulses for the label signal are generated by the combination of pulse generator 222; counter 224; comparator 225; register 226; triggerable flip-flop 227; and single-shot, one pulse generator 228 as follows: With the counter 224 and triggerable flip-flop 227 initially in the cleared state, comparator 225 indicates equality when the counter 224, driven by pulse generator 222, has reached a count equal to the number (e.g., 8) set in register 226. The equality level from the comparator 225 causes the counter 224 to be cleared through OR gate 229 and triggers triggerable flip-flop 227 to a 1 state, which fires the single-shot 228 to generate the shift pulse. The number set in register 226 and the frequency of the pulse generator 222 are chosen so that the shift pulse is generated at the midpoint in time of the scan of each of the equal width concentric rings. The label signal shift pulses are shown in diagram (d) of FIG. 8. With a counter, comparator, register and flip-flop circuit, the resulting shift pulse timing is adjustable for any desired application even when using a fixed frequency pulse generator.

Single shots 230 and 231 through OR gates 232 and 229 provide a clearing pulse to the counter 224 and the triggerable flip-flop 227 every time there is a transition from white to black or black to white on the label so that at any transition on the label the counter 224 and triggerable flip-flop 227 are cleared to the 0 state. If there are no transitions in the label, the counter 224 will again count to the number set in register 226, at which time the comparator 225 indicates equality, resetting the counter 224 and triggering triggerable flip-flop 227 to a 0 state which does not fire the single shot 228. This process will continue on a dead reckoning basis generating a shift pulse at the midpoint in time of the scan of each successive ring until a transition from white to black, 0 to 1, or black or white, 1 to 0, occurs in the label.

When the laser beam has completed a scan through the center of the label, the two shift registers 223 and 233 will contain identical numbers. Comparator 234 will indicate equality, firing the single shot 235 and setting flip-flop 236. The output of the single shot 235 is shown on diagram (c) of FIG. 8. This enables AND gate 237 and inhibits AND gate 238, providing a burst of fast shift pulses directly from the pulse generator 222 through OR gate 239 and inhibiting at AND gate 238 the slow shift pulses used in shifting in the label signal into shift registers 223 and 233. These fast shift pulses are counted in counter 240 and the AND gate 241 is connected to detect a count exactly equal to the length of shift register 223, at which point the single shot 242 is fired, clearing flip-flop 236 which inhibits any further fast shift pulses from the pulse generator 222 at AND gate 237. The 1 side of the flip flop 236 is shown in diagram e of FIG. 8. The fast shift pulses from the pulse generator 222 at the output of AND gate 237 are shown in diagram g of FIG. 8.

During this burst of shift pulses originating from the pulse generator 222, the contents of shift register 223 is shifted into shift register 233 and into the analysis logic. The signal at the output of shift register 223 during the burst of shift pulses is shown in diagram h of FIG. 8.

Counter 245, shown in FIG. 7B, counts the number of transitions in the label code during the shift into the analysis logic as follows. Transitions from black to white, 0 to 1, cause single shot 246 to fire. Transitions from white to black, 1 to 0, through inverter 248 cause single shot 247 to fire. The outputs of the single shots 246 and 247 are fed through OR gate 249 and AND gate 250 enabled by the 1 side of flip-flop 236 to the counter 245. The signals at the output of AND gate 250 are shown in diagram j of FIG. 8.

At the same time that counter 245 is counting the number of transitions, counter 251 is counting the number of like signals, the consecutive numbers of either black or white rings at the center of the label. The burst of shift pulses from the pulse generator 222 at the output of AND gate 237 and shown in diagram g of FIG. 8 are fed to the AND gate 252 enabled by the 0 side of cleared flip-flop 253. AND gate 252 is inhibited by the 1 side of flip-flop 253 when the flip-flop 253 is set by the output of the MOD2 ADDER 254. The output of the MOD2 ADDER will be a 1 only when the inputs are of different sign. Since the inputs to the MOD2 ADDER are the signal being shifted out of the shift register 223 shown in diagram h of FIG. 8 and that signal delayed one bit time by the one bit shift register 255, there will be an output of the MOD2 ADDER at the time of a sign change in the signal being shifted out of shift register 223 which sets flip-flop 253 and inhibits any further pulses being passed by AND gate 252. AND gate 252 remains inhibited until flip-flop 253 is cleared. The output of AND gate 252 is shown in diagram i of FIG. 8.

A first timing pulse (TPI), formed by delaying the clearing pulse for flip-flop 236 through delay 243, clears flip-flop 253 and counter 240, and tests certain gates to be mentioned later. A second timing pulse (TP2), formed by delaying TPI through DELAY 244, transfers the contents of counters 245 and 251 to registers 257 and 256 and tests AND gate 258, which will be found to be enabled by 1 side of data ready and reset flip-flop 59. The pulse TP2 passes through AND gate 258 and causes the transfer of the contents of shift register 233 into register 260. Pulses TP1 and TP2 are shown in diagram f of FIG. 8. Assuming that the label has moved a small distance across the scanning slot but has still been scanned through the black central circle formed by the center four rings of the label shown in FIG. 2, and that the shift registers 223 and 233 contain identical numbers, causing an equality indication from comparator 234, which in turn results in the burst of pulses from the pulse generator as described previously, counter 245 will count the number of transitions in the label code and counter 251 will count the number of like signals near the center of the label in the manner previously described. If the label has moved far enough across the slot so that the number of non-transitions, which are the pulses in FIG. 8 i representing rings near the center of the label, has decreased, counter 251 will contain a smaller number than register 256 and comparator 261 will indicator "Counter<Register".

There will have been no change in the number of transitions from black to white and white to black in the label so that counter 245 and register 257 will contain the same number and comparator 262 will not indicate either "Counter<Register" or "Counter>λ Register".

Pulse TP1 will again be formed by delaying the clearing pulse for flip-flop 236 through DELAY 243 clearing flip-flop 253 and counter 240 and testing AND gates 263 and 264 of AND gate means 58. AND gate 264 will be found to be inhibited because comparator 262 does not indicate Counter<Register, but AND gate 263 will be found enabled because comparator 261 does indicate Counter<Register and comparator 262 does not indicate Counter>Register. TP1 then will be passed by AND gate 263 through OR gate 265 clearing data ready and reset flip-flop 59 and indicating by the Data Ready Level that data is ready to be transferred from register 260 to a computer or other interfacing equipment. The data in register 260 is the label code from the previous scan. TP2 will again be formed by delaying TP1 through DELAY 244. TP2 will be inhibited at AND gate 258 by the 1 side of flip-flop 59 now in the cleared state, while the contents of counters 251 and 245 will be transferred to registers 256 and 257. Flip-flop 59 remains in the cleared state until set by the reset pulse, described above.

To more fully understand the decoded signals transmitted during various label scans and the analysis of the scans by discriminator 56, reference should also be made to FIG. 9. Label portion 63 is traversed by label diameter scan line 64 and label chord scan line 65. Directly below label portion 63, the shaped voltage signals representing scans 64 and 65 are shown.

Since label 63 has a center code ring of black surrounded by several code rings of white, chord scan 65, as shown, missed scanning through the center ring. In this situation, as can be seen by reference to the shaped voltage signals for scans 64 and 65, there has been a decrease from 16 transitions from black to white and white to black in scan 64 to 14 such transitions in scan 65. As a result, counter 245 of FIG. 7B will contain a smaller number than register 257 and comparator 262 will indicate counter<register.

As can be seen from the shaped voltage signals of FIG. 9, chord scan 65 displays six like signals at the label center, while label diameter scan 64 displays two like signals. Since there is a greater number of like signals with scan 65, counter 251 of FIG. 7B contains a larger number than register 256. Consequently, comparator 261 will not indicate counter<register. When AND gates 263 and 264 are tested by TP1, gate 263 will be inhibited, but gate 264 will be enabled for transmission of a data ready clearing pulse.

In some situations, as the label is moving across the scanning aperture, i.e., as the scans are progressing from tangency with the outer circumference of the label toward the center, it is possible to find a decreasing number of like signals at the center of the shaped voltage signal without having a label diameter scan. This can best be understood by referring to FIG. 9, where label portion 68 is traversed by chord scans 69 and 70. The shaped voltage signals representing scans 69 and 70 are shown directly below label portion 68. As can best be seen by referring to the shaped voltage signals, there are seven like signals at the center of chord scan 69 while only one like signal exists in chord scan 70. Consequently, comparator 261 of FIG. 7B indicates counter<register. However, whenever there is a reduction in the number of like signals at the center of a shaped voltage signal without having a label diameter scan, there will always be an increase in the number of transitions from black to white and white to black.

As shown in FIG. 9, scan 69 comprises eight transitions while scan 70 comprises ten such transitions. As a result, comparator 262 of FIG. 7B indicates counter<register, which through inverter 271 inhibits AND gate 263, thereby preventing a data ready clearing pulses to be transmitted.

The best summary of the operation of the reader might be that each scan is analyzed to determine if the previous scan was near enough to the center of the label to have recorded the correct reading of the label code in the output register, register 260.

Texas Instrument type SN 7493 binary counters described on pages 8–13, 8–15, 8–16, and 8–17 of their Catalog CC 201 are adaptable for use as the counters in this reader.

Texas Instrument type SN 7495 shift registers described on pages 9–25, 9–26, 9–27, 9–28, 9–29, 9–30, and 9–31 of their Catalog CC 201 are adaptable for use as the registers and shift registers in this reader.

Texas Instrument type SN 74L85 comparator described on pages 11–1, 11–2, 11–3, 11–4, 11–5, 11–6, and 11–7 of their Catalog CC 201 are adaptable for use as the comparators in this reader.

Texas Instrument type SN 74121 monostable multivibrators described on pages 2–39, 2–40, 2–41, 2–42, 2–43, and 2–44 of their Catalog CC 201 are adaptable for use as the single shots, Schmidt Triggers, and DELAYS in this reader.

TOLERANCE ON SCAN THROUGH CENTER

It can be seen from diagram (b) of FIG. 8 showing the output of edge triggered flip-flop 221 and diagram (d) of FIG. 8 showing the shift pulse, that because the code signal is sampled exactly in the middle under ideal conditions, i.e., when the beam is scanning directly through the center of the label, some departure from the ideal is permissible for a correct reading. As long as the code signal or a series of like signals, 1's or 0's, is not foreshortened or lengthened by more than one-half of an ideal code signal time, the code in the label will be correctly read. The most severe foreshortening effect when the label is not scanned exactly through the center, occurs at the center ring when the next adjacent outer ring is of the opposite code. As long as the foreshortening of the center ring is less than one-half a binary code time, the label can be correctly read, and this along with the consideration of the sharpness of the focusing of the laser beam by the lens system and the foreshortening of the code times at the extreme lateral positions on the scanning slot, determine the distance away from the exact center that the label can be scanned for a correct reading.

The distance from the exact center at which a scan is permitted for a correct reading determines the speed at which the label can be moved across the slot with a given scanner speed, since the label must move across the slot at a speed that permits at least one scan in the permissible range for a correct reading. If desired, the center of the label can be fixed (not coded with information) to be equivalent to two or more equal width code rings both black or white in order to increase the speed at which the label can be moved across the slot. The operational speed increases when the size of the non-coded center of the label increases because the center ring of the label traverses the scanning slot more rapidly than any other ring. Consequently, the larger the non-coded area is, the larger the effective scanning center becomes, and the more quickly the label can be moved over the scanning slit.

It will thus be seen that the objects set forth above, among those made apparent from the preceding description, are efficiently attained and, since certain changes may be made without departing from the scope of the invention, it is intended that all matter contained in the above description shall be interpreted as illustrative so as to obtain the benefit of all equivalents to which the invention is fairly entitled.

It is also to be understood that the following claims are intended to cover all of the generic and specific features of the invention, herein described, and all statements of the scope of the invention which, as a matter of language, might be said to fall therebetween.

Having described our invention, what we claim as new and desire to secure by Letters Patent is:

1. Label reader apparatus for reading and translating an encoded lable having a plurality of discrete bands of contrasting radiation reflectivity levels, comprising:
   A. a source of radiation for impingement upon the coded label;
   B. a scanning slit juxtaposed in spaced relationship to said readiation source;
   C. a movable beam redirecting surface adapted for projecting and sweeping the projected radiation beam across the scanning slit, comprising
      1. a polygonal shaped mirror drum having
         a. a polygonal shaped support comprising a polygonal cylinder having a plurality of substantially flat circumferential surfaces, and
         b. a plurality of mirrors respectively adjustably mounted to the circumferential surfaces of the support, assuring sweeping movement of said beam by said plurality of surfaces in substantially the same plane, and
      2. a motor connected to said mirror drum for rotation thereof;
   D. a label information assembly comprising:
      a. means for translating the reflected radiation into an output signal, and
      b. a label-reading sub-assembly for determining when the label code has been read; and E. a light pipe positioned between said movable beam redirecting surface and said scanning slit and adapted for receiving the label reflections and directing the label reflections toward the label information assembly.

2. Apparatus as defined in claim 1, wherein the mirror drum further comprises:

c. resiliently depressible adhesive interposed between said mirrors and said said support, and d. pitch adjusting and securing means joining said mirrors to said support.

3. Apparatus for receiving and directing radiation comprising a polygonal shaped mirror drum having A. a polygonal-shaped support comprising a polygonal cylinder having a plurality of substantially flat circumferential surfaces;

B. a plurality of mirrors respectively adjustably mounted to the circumferential surfaces of the support; and C. resiliently compressible members interposed between said mirrors and said support, whereby the radiation directed by said plurality of surfaces is adjustably controllable.

4. The apparatus defined in claim 3, further comprising:

D. pitch adjusting and securing means joining said mirrors to said support.

5. An apparatus defined in claim 4, wherein said pitch adjusting and securing means comprises screws peripherally mounted about said mirrors and into said support.

* * * * *